United States Patent [19]
Asai et al.

[11] Patent Number: 5,129,739
[45] Date of Patent: Jul. 14, 1992

[54] BEARING WITH DYNAMIC PRESSURE GROOVES AND METHOD FOR MANUFACTURING THE SAME

[75] Inventors: Hiromitsu Asai, Samukawa; Hiromi Sugi, Ayase; Takashi Nagato, Tokyo, all of Japan

[73] Assignee: Nippon Seiko Kabushiki Kaisha, Tokyo, Japan

[21] Appl. No.: 807,421

[22] Filed: Dec. 13, 1991

Related U.S. Application Data

[63] Continuation of Ser. No. 563,421, Aug. 7, 1990, abandoned.

[30] Foreign Application Priority Data

Aug. 9, 1989 [JP] Japan ................................. 1-206572
Dec. 12, 1989 [JP] Japan ................................. 1-321764

[51] Int. Cl.⁵ ............................................. F16C 33/20
[52] U.S. Cl. ................................... 384/292; 384/300; 384/907.1; 384/909; 384/911; 384/913
[58] Field of Search ............... 384/292, 286, 300, 297, 384/908, 911, 907.1, 909, 913

[56] References Cited

U.S. PATENT DOCUMENTS

| | | | |
|---|---|---|---|
| 3,464,845 | 9/1969 | Osborn et al. | 384/905 |
| 4,123,122 | 10/1978 | Gabrielson et al. | 384/300 |
| 4,865,467 | 9/1989 | Becker et al. | 384/300 |
| 4,875,263 | 10/1989 | Furumura | 384/297 |

*Primary Examiner*—Lenard A. Footland
*Attorney, Agent, or Firm*—Basile and Hanlon

[57] ABSTRACT

A bearing with dynamic pressure grooves includes an outer cylinder made of a metal and a resin sheet bonded to the inner peripheral surface of the outer cylinder. The resin sheet is made of a thermoplastic resin, for example, a polytetra fluoroethylene, as a main component mixed with a wear-resistant improving material, for example, graphite or the like. The resin sheet is formed with a pattern of dynamic pressure generating grooves formed in an inner surface by plastic work. The pattern of grooves is varied depending on the types of relative movement between the outer cylinder and a shaft body, i.e., whether an axial linear movement, a rotational movement, or a spiral movement.

2 Claims, 3 Drawing Sheets

BEARING WITH DYNAMIC PRESSURE GROOVES AND METHOD FOR MANUFACTURING THE SAME

This application is a continuation of application Ser. No. 07/563,421, filed on Aug. 7, 1990, abandoned.

BACKGROUND OF THE INVENTION

1. Field of the Invention

The present invention relates to a bearing with dynamic pressure grooves used for office equipment, acoustic equipment, measurement equipment, and the like, and to a method for manufacturing the same.

2. Description of the Prior Art

A prior art cylindrical slide bearing made of a synthetic resin, in particular, a bearing having dynamic pressure grooves for generating a dynamic pressure formed in an inner peripheral surface, is manufactured by injection molding in a mold by using a compound material containing an elastic thermoplastic mixed with a lubricating material, such as graphite, carbon fiber, molybdenum disulfide, fluoroplastic, or the like, and by drawing the bearing out of the mold by utilizing the elasticity of the resin. However, as to a bearing having dynamic pressure grooves using a thermoplastic other than a PTFE (polytetrafluoroethylene), although it is possible to manufacture such a bearing, molding shrinkage is large, dimensional tolerances are not sufficient, and friction properties are not satisfactory. Thus, the performance required for the bearing with dynamic pressure grooves is not sufficiently met.

In contrast, Japanese Patent Laid-Open Application No. 63-203916 (hereinafter referred to as a first prior art example) proposes a bearing with dynamic pressure grooves using a thermosetting plastic and exhibiting a high accuracy, and a method for manufacturing the same. This bearing with dynamic pressure grooves includes a thin wall inner cylindrical body made of a thermosetting plastic, such as an epoxy resin, phenolic resin, unsaturated polyester resin, diallylphthalate resin, or the like, and formed with grooves for generating a dynamic pressure in an inner peripheral surface. This bearing further includes a metallic outer cylindrical body. The thin wall inner cylindrical body is secured to the inner peripheral surface of the outer cylindrical body.

In manufacturing this bearing with dynamic pressure grooves, an outer cylindrical body formed with a plurality of rows of recessed grooves in an inner peripheral surface, or applied with a securing means, such as an adhesive or the like beforehand, is fitted into an outer mold. Following this, a molding material of a heated and melted thermosetting resin is supplied into an annular space having a narrow width between the outer cylindrical body fitted into the outer mold and an inner mold having ridges corresponding to the shape of the dynamic pressure generating groove formed and arranged on an outer peripheral surface thereof. An inner cylindrical body is formed by hardening the molding material, and at the same time, the inner cylindrical body is made to be secured to and held by the outer cylindrical body by the securing means thereby to form a laminated structure having the inner cylindrical body and the outer cylindrical body integrally coupled together. Thereafter, the laminated structure of the inner cylindrical body and the outer cylindrical body is drawn out of the outer mold and the inner mold in an axial direction so that the laminated structure is separated from the outer and inner molds.

Japanese Utility Model Laid-Open Application No. 60-93012 discloses a bearing with dynamic pressure grooves (hereinafter referred to as a second prior art example) in which dynamic pressure grooves are formed in one surface of a flat plate by etching or plastic work in advance. This flat plate is then wound in a shape which matches the shape of an outer peripheral surface of a shaft, or the shape of an inner peripheral surface of a supporting member of the shaft, and the opposite ends or edges of the flat plate are butted and joined to each other to thereby form a sleeve. The sleeve is fitted about and secured to the outer peripheral surface of the shaft, or fitted into and secured to the inner peripheral surface of the supporting member, to form a fluid bearing.

Furthermore, Japanese Utility Model Laid-Open Application No. 63-27143 discloses a bearing with dynamic pressure grooves (hereinafter referred to as a third prior art example) in which a shaft body and a bearing are made to move relative to each other in a forward and a reverse direction through mutual slide surfaces. At least one of the slide surfaces is formed with dynamic pressure generating grooves having an arrowhead shape. This bearing is a dynamic pressure type slide bearing. The dynamic pressure generating grooves include one group of grooves whose arrow tip direction is coincident with one of the directions of movement of the shaft body and the bearing and another group of grooves whose arrow tip direction is coincident with the other of the directions of movement of the shaft body and the bearing. As a result, this bearing is a slide bearing in which the dynamic pressure is generated in both forward and reverse directions, that is, in both one and the other directions of the movement of the bearing.

However, in the first prior art example mentioned above, although the thermosetting resin has an excellent molding accuracy, a problem is involved in that the resin itself has poor friction properties and wear-resistant properties and, even when a lubricating material, such as graphite, carbon fiber, molybdenumdisulfide, or the like, is mixed with the thermosetting resin, satisfactory friction properties and wear-resistant properties cannot be obtained.

Furthermore, another problem is involved when a plurality of unitary bearings are assembled to form a unit assembly. In this structure, it is difficult to arrange the plurality of bearings so that inner diameters thereof are exactly coaxial to one another or to obtain the desired coaxiality.

Also, the second prior art example is the fluid bearing of a radial type in which the shaft is supported by a dynamic pressure of fluid generated in the dynamic pressure generating grooves by rotation of the shaft and the pressure generating grooves are formed continuously over the entire circumference of the outer peripheral surface of the shaft, or the inner peripheral surface of the support member. However, this bearing is manufactured in such a manner that, first, the sleeve is formed by winding a flat plate having dynamic pressure generating grooves formed beforehand in one surface, and by butting and joining opposite ends of the plate. The sleeve is then fitted about and secured to an outer peripheral surface of a shaft, or is fitted into and secured to an inner peripheral surface of a supporting member. As a result, a problem is involved in that the manufacturing process is complicated and the manufacturing cost is high. Furthermore, a uniform quality is difficult to achieve because of variations of the length of the cut flat plate, roughness of the butting portions of the opposite ends of the flat plate, nonuniformity in fitting of the formed sleeve about the shaft or into the supporting member, and the like.

On the other hand, in the dynamic pressure type slide bearing in the third prior art example, in the case wherein the mutual slide surfaces of the shaft body and the bearing are cylindrical, the dynamic pressure generating grooves of an arrowhead shape are formed over the entire circumference of at least one of the slide surfaces. However, it is difficult to manufacture this dynamic pressure type slide bearing on the basis of mass production.

SUMMARY OF THE INVENTION

The present invention was made in view of the problems mentioned above in the prior art, and it is an object of the invention to provide a bearing with dynamic pressure grooves and a method for manufacturing the same in which the bearing is made of a resin containing as a main component a PTFE, which is a thermoplastic resin having excellent friction properties, such that the bearing has excellent friction properties and wearresistant properties, as well as excellent dimensional tolerances.

Another object of the invention is to provide a bearing with dynamic pressure grooves and a method for manufacturing the same in which the bearing is easily manufactured by forming dynamic generating grooves of an arrowhead shape in a limited range of a predetermined circumferential angle instead of forming the grooves over the entire circumference in an inner peripheral surface of a cylindrical body such that the bearing is inexpensive and has excellent dimensional tolerances to maintain concentricity and, further, generates a dynamic pressure in both forward and reverse directions of movement.

A bearing with dynamic pressure grooves according to the present invention comprises an outer cylinder, a sheet made of a resin containing a PTFE as a main component and bonded to an inner peripheral surface of the outer cylinder, and grooves for generating a dynamic pressure formed in an inner surface of the sheet.

Furthermore, the bearing with dynamic pressure generating grooves and using PTFE of the present invention may have a plurality of sheets made of a resin containing PTFE as a main component and bonded to the inner peripheral surface of the outer cylinder at a predetermined interval in an axial direction. Each sheet may have grooves for generating dynamic pressure formed in an inner surface thereof.

In a method for manufacturing the bearing with dynamic pressure grooves of the present invention, a sheet is formed of a resin containing a PTFE as a main component, grooves for generating a dynamic pressure are formed in one surface of the sheet by plastic work, the sheet is wound so that the other surface thereof faces an inner peripheral surface of an outer cylinder through an adhesive material, a cylindrical body is inserted inside the wound sheet, and the cylindrical body is removed after the adhesive material hardens.

Furthermore, in a bearing with dynamic pressure grooves in another aspect of the invention, a sheet is bonded to an inner peripheral surface of an outer cylinder, grooves for generating a dynamic pressure are formed in an inner surface of the sheet, and the sheet is bonded with a gap between opposite ends of the sheet in a circumferential direction.

The gap between the circumferential opposite ends of the sheet may be formed with a center angle of not larger than 120 degrees at an inner peripheral surface of the outer cylinder.

Furthermore, a plurality of sheets may be bonded at a predetermined interval in an axial direction. Each sheet may be formed with dynamic pressure generating grooves in an inner surface.

In a method for manufacturing this bearing with dynamic pressure grooves in another aspect of the invention, the sheet is formed of a resin containing a PTFE as a main component. The sheet is formed with dynamic pressure generating grooves in one surface by plastic work, a width of the sheet is made smaller than a circumferential length of the outer cylinder, the sheet is wound so that the other surface of the sheet faces an inner surface of the outer cylinder through an adhesive material, an inner cylindrical body is inserted into the inside of the wound sheet, and the inner cylindrical body is removed after the adhesive material is hardened.

Furthermore, as a resin material of the sheet, a resin containing a PTFE as a main component may be used.

The present invention will be described in detail.

The resin containing the PTFE as a main component used in the present invention is a mixture of the PTFE with a material for improving wear-resistant properties. The content of the PTFE is preferably 50 to 90 wt %. When it is less than 50 wt %, the wear-resistant properties which are the characteristic properties of the PTFE will be degraded. On the other hand, when it is larger than 90 wt %, loadings of the wear-resistant properties improving material will be excessively small such that the wear-resistant properties will not be improved. However, the content is not limited to the above-mentioned range, and it may be less than 50 wt %, or it may exceed 90 wt %.

As the wear-resistant properties improving material, the following material, for example, graphite, carbon fiber, molybdenumdisulfide, polyimide, polyoxybenzoil, glass fiber, or the like, may be used.

The sheet of the resin containing the PTFE as a main component may be formed by a well-known resin sheet manufacturing method by using a mixed material of the above-mentioned PTFE resin and the wear-resistant properties improving material. For example, the mixed material is made paste-like by adding an organic solvent, such as naphtha, and after forming a sheet-like material by a calendar process, the sheet-like material is calcined in a heating oven after the solvent is volatilized. Alternatively, the mixed material is calcined after a fluid dispersion flows out onto a metal surface, and a formed film is released to obtain the sheet, or the sheet is obtained by cutting a molded cylinder block. The thickness of the sheet is preferably 0.1 to 2.0 mm.

In bonding the sheet of the resin containing the PTFE as a main component to the inner peripheral surface of the outer cylinder, a surface of the sheet to be bonded is subjected to a chemical treatment (dehydrofluorine treatment) beforehand in accordance with a known method. This is a treatment for improving the adhesive properties of the sheet, and a surface treatment using a primer which is exclusively used for a fluorine resin, or a so-called sodium treatment, may be used.

As an adhesive, a rubber adhesive mixed with a solvent to a suitable viscosity, or a thermosetting adhesive, or the like may be used. The adhesive as mentioned above is coated uniformly on a surface which is to be bonded and chemically treated of the resin sheet containing the PTFE as a main component and, then, the coated surface is half dried. Alternatively, instead of coating the adhesive on the sheet, the adhesive may be coated on an inner peripheral surface of the outer cylinder.

The depth of the grooves for generating a dynamic pressure is preferably 5 to 60 micrometers in order to obtain an appropriate dynamic pressure effect. However, it is preferable that the depth of the grooves for generating a dynamic pressure formed in the inner surface of the sheet of the resin containing the PTFE as a main component is somewhat larger than 5 to 60 micrometers before the sheet is bonded to the outer cylinder. The grooves for generating a dynamic pressure are formed beforehand in one surface of the sheet of the resin containing the PTFE as a main component by plastic work. For example, the other surface of the sheet which is the surface to be bonded is chemically treated for bonding, and subsequently, the surface which has not been chemically-treated is formed or rolled with the grooves for generating a dynamic pressure by a rolling machine. At the same time, the thickness of the sheet is made uniform. The heating temperature during the rolling is preferably at 100° to 200° C. In this case, however, the chemical treatment for the bonding may be carried out after the plastic work for the dynamic pressure generating grooves.

Furthermore, the plastic work for the dynamic pressure generating grooves may be formed by stamping instead of rolling.

The sheet of the resin containing the PTFE as a main component which has one surface coated with the adhesive (when the adhesive is coated on the outer cylinder, this surface to be bonded is only chemically-treated) and the other surface plastically worked with the dynamic pressure generating grooves is cut to a required length. Then the cut sheet is wound so that the surface to be bonded becomes an outer surface. The wound sheet is then inserted into the outer cylinder.

At this time, in the method for generating the bearing with dynamic pressure grooves wherein the sheet has a gap between circumferential opposite edges or ends, the length of the resin sheet is made shorter than the entire length of the circumference of the inner peripheral surface of the outer cylinder. In other words, the resin sheet which is bonded to the inner peripheral surface of the outer cylinder does not have its circumferential opposite ends butted to each other and the sheet is bonded with a gap between its opposite ends in a circumferential direction. The reason for this is that when a shaft body is inserted into the bearing and when the bearing is practically used as a bearing with dynamic pressure grooves for a linear movement or a rotational movement, the load received by a bearing surface from the shaft body is directed in one direction in many cases and the load is hardly applied to the opposite side of the loading side. Thus, the range of receiving the load is limited. Accordingly, there is no practical problem even when the dynamic pressure generating grooves are not present in the opposite side of the loading side. For this reason, when a portion of the sheet which does not affect the holding of the load is removed and a gap is formed between the circumferential opposite ends of the sheet, butting of the ends becomes unnecessary and the manufacture is very easy and an inexpensive bearing can be obtained.

In order to maintain the concentricity between the inner peripheral surface of the outer cylinder and the bearing surface having the dynamic pressure generating grooves, it is only necessary that a bonding range of the sheet formed with the dynamic pressure generating grooves is not less than 240 degrees in a circumferential angle. In other words, it is preferable that the gap formed between the circumferential opposite ends of the bonded sheet is made 120 degrees or less in a center angle at an inner circumference of the outer cylinder.

Furthermore, in the method for manufacturing these bearings with dynamic pressure generating grooves, after the wound sheet is inserted into the outer cylinder, a rod which is a cylindrical body made of metal or plastic is press fitted with a small force into the inside of the wound sheet. At this time, it is preferable that the cylindrical body has a diameter somewhat larger than the diameter of the inner peripheral surface of the bearing with dynamic pressure grooves which is to be eventually formed. The sheet is heated with the rod inserted into the wound sheet in order to harden the adhesive. When, for example, rubber adhesive is used as an adhesive, the heating may be carried out at a temperature of 60° to 150° C. and for a period of 10 to 60 minutes.

During such heating, when the inner surface of the sheet is pressed by the rod and is plastically deformed to some extent, it is easy to maintain the concentricity between the inner peripheral surface of the outer cylinder and the bearing surface having the dynamic pressure generating grooves.

Accordingly, the coefficients of linear expansion of the outer cylinder, the rod and the sheet are selected such that the coefficient of linear expansion of the rod is larger than that of the outer cylinder, or the coefficients of linear expansion of the rod and the sheet are larger than that of the outer cylinder. By selecting the coefficients of linear expansion in this manner, it is possible to first insert the rod relatively easily while during heating the rod is thermally expanded so that the inner surface of the sheet is pressed by the rod and the sheet is plastically deformed as desired. To this end, the materials of the rod and the outer cylinder may be suitably selected by utilizing the fact that the coefficient of linear expansion of aluminum is larger than that of steel, and the coefficient of linear expansion of the resin containing PTFE as a main component is larger than that of aluminum.

Furthermore, when the coefficients of linear expansion of the outer cylinder, the rod and the sheet are selected as mentioned above, even when the rod is inserted into the inside of the sheet with a radial gap therebetween, during heating the inner surface of the sheet is pressed by the rod and a slight plastic deformation results.

When a cold cure type adhesive is used, there is no need for heating, and it is only required to leave the sheet with the rod inserted into the inside thereof for a period of time required to cure the adhesive at an ordinary temperature.

After the adhesive has hardened and the sheet is bonded to the inner peripheral surface of the outer cylinder, the rod is drawn out of the inner surface of the sheet.

A plurality of wound sheets may be inserted into the outer cylinder at a predetermined interval in an axial direction and each of the wound sheets may be bonded to the inner surface of the outer cylinder. Also, in this case, each sheet is commonly pressed by the rod and each sheet is bonded to the inner peripheral surface of the outer cylinder with a slight plastic deformation. Thus, excellent dimensional tolerances of the inner diameter and excellent coaxial arrangement can be achieved.

DESCRIPTION OF THE PREFERRED EMBODIMENTS

Embodiments of the invention will be described with reference to the drawings.

In a bearing with dynamic pressure grooves, a shaft body and the bearing perform through mutual slide surfaces a relative movement including a rotational movement in one direction, forward and reverse rotational movements, a linear movement in an axial direction, or a spiral movement. Therefore, a pattern of grooves for generating a dynamic pressure is determined in accordance with the type of the relative movement.

A first embodiment is shown in FIGS. 1A to 1D, and FIGS. 2A and 2B. In this embodiment, a bearing 20 with dynamic pressure grooves performs a forward and a reverse linear movement in an axial direction relative to a shaft body 10.

The bearing 20 with dynamic pressure grooves includes an outer cylinder 21 made of a metal and a plurality of sheets 22 made of a resin containing a PTFE as a main component. The sheets 22 are bonded to an inner peripheral surface of the outer cylinder 21 at a predetermined interval in the axial direction. Each of the sheets 22 has grooves 60 and 70 of an arrowhead shape, a diamond shape, or a zigzag shape as shown in FIGS. 1B, 1C and 1D formed in an inner surface for generating a dynamic pressure.

Figure 1A:
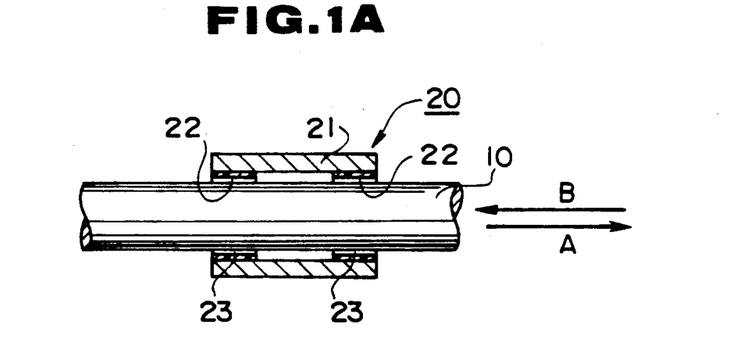
FIG. 1A is a longitudinal sectional view of a bearing with dynamic pressure grooves of an embodiment of the present invention.
Figure 1B:
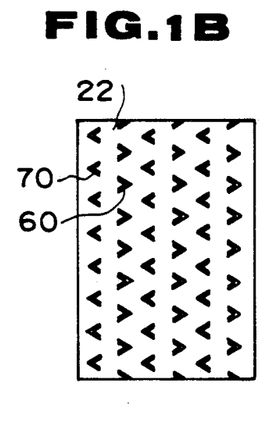
FIGS. 1B, 1C and 1D are plan elevational views showing patterns of grooves for generating a dynamic pressure.

In the grooves shown in FIG. 1B, a group or column of grooves 60 having an arrowhead shape whose arrow tip is directed to an axially right direction and a further group or column of grooves 70 having an arrowhead shape whose arrow tip is directed to an axially left direction are alternately arranged at substantially equal intervals in the axial direction. The interval of the grooves 60 or 70 in a circumferential direction is suitably selected.

Figure 1C:
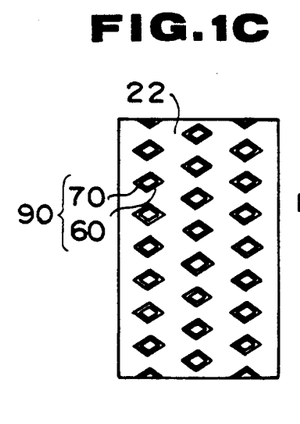

In the grooves shown in FIG. 1C, a plurality of groups or columns of grooves 90 having a diamond shape (each diamond is formed by combining or connecting back-to-back the arrow-shaped groove 60 whose arrow tip is directed to the axially right direction and the arrow-shaped groove 70 whose arrow tip is directed to the axially left direction) are successively arranged at substantially equal intervals in the axial direction. The interval of the grooves 90 in a circumferential direction is suitably selected.

Figure 1D:
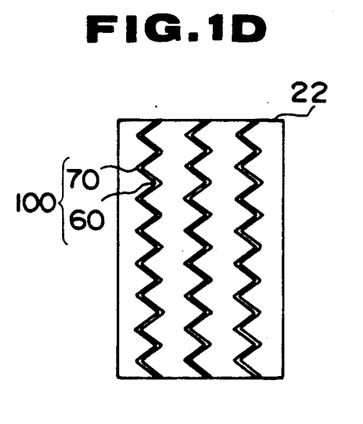

In the grooves shown in FIG. 1D, a plurality of groups or columns of grooves 100 having a zigzag shape (each zigzag shape is formed by combining or connecting in a direction orthogonal to the axial direction, the arrow-shaped groove 60 whose arrow tip is directed to the axially right direction and the arrow-shaped groove 70 whose arrow tip is directed to the axially left direction) are successively arranged at substantially equal intervals in the axial direction.

The depth of the grooves 60 and 70 (and 90 and 100) is suitably selected in a range of several micrometers to several tens of micrometers.

As a lubricant for the bearing 20 mentioned above, any one of oil, grease, water, air, and the like is used.

In the case in which the shaft body 10 is moved linearly in the direction of arrow A, due to a pumping action of the grooves 60 whose direction of the arrow tip is coincident with the direction A of movement, a pressure of fluid in the arrow tip portion becomes high such that the shaft body 10 is supported by a fluid film of the lubricant which flows into a bearing gap 23. Conversely, when the shaft body 10 is moved linearly in the opposite direction of arrow B, due to a pumping action of the grooves 70 whose direction of the arrow tip is coincident with the direction B of movement, a pressure fluid in the arrow tip portion becomes high such that a fluid film is formed by the lubricant which flows into a bearing gap 23.

The bearing 20 with dynamic pressure grooves is manufactured in the following processes.

First, the resin sheet 22 is made of a resin containing PTFE as a main component. The main component is mixed with a wear-resistant properties improving material, for example, glass fiber. One surface of the resin sheet 22 is subjected to a dehydrofluorine treatment which is a pretreatment for bonding. In this embodiment, the dehydrofluorine treatment is performed in accordance with a normal method by using a primer which is exclusively used for a fluorine resin. Following this, the sheet 22 is applied to a rolling machine and the grooves 60 and 70 for generating a dynamic pressure are formed in the other surface which is not dehydrofluorine-treated while the sheet 22 is being heated and pressed. Subsequently, the surface of the sheet 22 which has been dehydrofluorine-treated is uniformly coated with a rubber adhesive which is adjusted to a suitable viscosity by a solvent. After the solvent is volatilized and the sheet 22 is half dried, the sheet 22 is cut to a desired size. Two sheets 22 having exactly the same size are wound in a hollow cylindrical shape so that the adhesive coated surface becomes the outer surface. The two wound sheets 22 are inserted into an outer cylinder 21 made of a metal (or plastic) at a predetermined interval in the axial direction to thereby attach the two sheets 22 to the outer cylinder 21 in a condition shown in FIG. 2A. In this condition, an inner diameter of the sheet 22 is represented by d. Thereafter, a rod R which is a cylindrical body having an outer diameter D is inserted into the inside of the inserted sheets 22. The outer diameter D of the rod R is somewhat larger than the inner diameter d of the sheets 22. However, since the sheets 22 are elastically deformable and, also, since the coefficient of friction between the sheets 22 and the outer cylinder 21 is large at the time of insertion, it is possible to insert the rod R into the sheets 22. Thereafter, when the heating is applied to a predetermined temperature, since the coefficient of linear expansion of the sheets 22 is larger than that of the outer cylinder 21, the pressing force exerted by the rod R to the sheets 22 exceeds the pressing force which is applied to the sheets 22 when the rod R is inserted into the inside of the sheets 22.

Figure 2A:
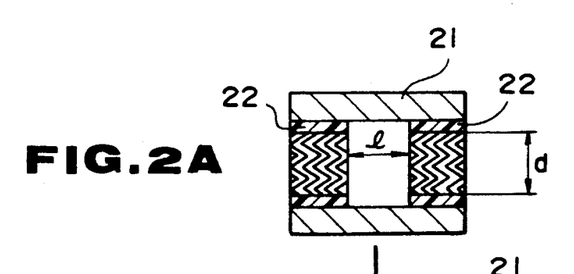
FIGS. 2A and 2B are longitudinal sectional views for explaining manufacturing processes of the bearing with dynamic pressure grooves of the present invention.

When aluminum is used for the outer cylinder 21 and steel is used for the rod R, the difference between the coefficients of linear expansion of the outer cylinder 21 and the rod R is small and the coefficient of linear expansion of the sheet 22 is several times larger than that of the outer cylinder 21. As a result, the pressing force which is applied to the sheet 22 by the rod R is larger than that which is applied to the sheet 22 at the time when the rod R is pressed into the inside of the sheet 22.

Figure 2B:
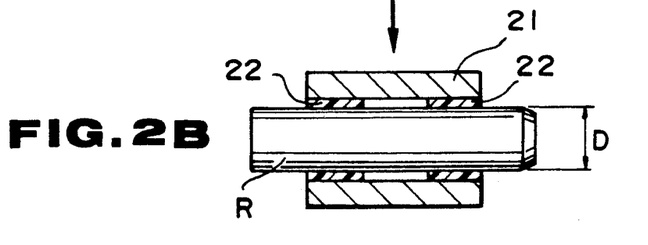

By utilizing a plastic deformation of the sheet 22 due to the pressing force of the rod R, the sheet 22 is draped to the inner surface of the outer cylinder 21 as well as to the outer surface of the rod R. When the adhesive is hardened after a lapse of predetermined hours, the rod R is drawn out of the inner peripheral surface of the sheet 22.

In this manner, by commonly pressing the two sheets 22 bonded to the outer cylinder 21 at an interval of l in the axial direction by the single rod R to cause the plastic deformation of the sheets 22, the bearing 20 with dynamic pressure grooves which insures excellent dimensional tolerances of the inner diameter and the coaxiality of both axial end portions can be obtained.

Figure 3A:
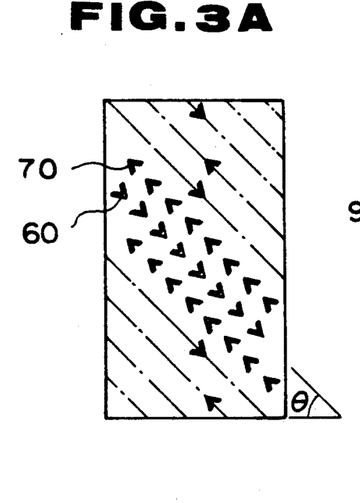
FIGS. 3A and 3B are plan elevational views showing other patterns of grooves for generating a dynamic pressure.
Figure 3B:
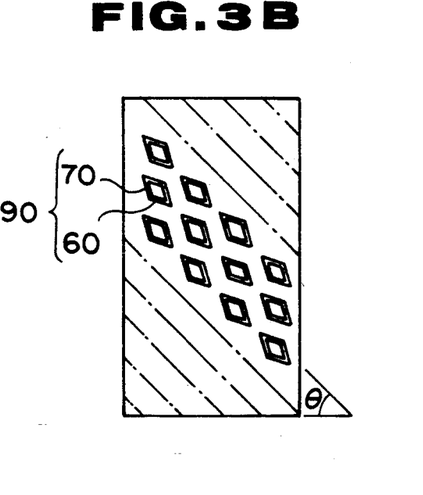

FIGS. 3A and 3B, and FIGS. 4A and 4B show variations in the grooves for generating a dynamic pressure. The patterns of the grooves shown in FIGS. 3A and 3B are used in the case in which the shaft body 10 and the bearing 20 with dynamic pressure grooves perform a forward and a reverse spiral movement relative to each other. In FIG. 3A, a first group of grooves 60 wherein the arrow tip of each arrowhead-shaped groove 60 is directed slantingly and downwardly towards a lead angle $\theta$ of the shaft body 10, and a second group of grooves 70 wherein the arrow tip of each arrowhead-shaped groove 70 is directed slantingly and upwardly towards the opposite direction of the lead angle $\theta$ of the shaft body 10 are alternately arranged in parallel to the direction of the lead angle $\theta$. In FIG. 3B, a plurality of groups of grooves 90 are arranged in parallel to one another along the direction of a lead angle $\theta$. Each group includes diamond-shaped grooves 90, and each diamond-shaped groove 90 is formed by connecting an arrowhead-shaped groove 60 having an arrow tip directed toward a lead angle $\theta$ and an arrowhead-shaped groove 70 having an arrow tip directed opposite to the lead angle $\theta$. In FIG. 3B, four columns of the diamond-shaped grooves 90 are arranged in the axial direction.

Figure 4A:
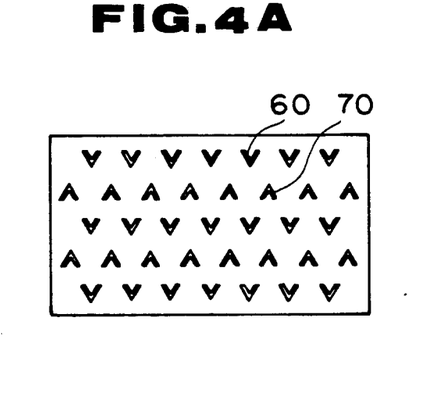
FIGS. 4A and 4B are plan elevational views showing still other patterns of grooves for generating a dynamic pressure.
Figure 4B:
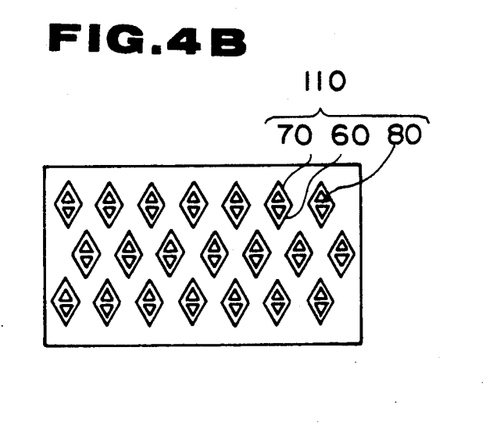

FIGS. 4A and 4B show patterns of grooves which are used in the case of a bearing with radial dynamic pressure grooves in which the shaft body 10 and the bearing 20 with dynamic pressure generating grooves perform a forward and a reverse rotation relative to each other. In FIG. 4A, a first group or row of grooves 60 wherein the arrow tip of each arrowhead-shaped groove 60 is directed downwardly and a second group or row of grooves 70 wherein the arrow tip of each arrowhead-shaped groove 70 is directed upwardly are alternately arranged in parallel to each other at equal intervals along the circumference of the sheet. The interval in the axial direction of the grooves 60 and, also, the grooves 70 is suitably selected. In FIG. 4B, a plurality of groups or rows of grooves 110 are arranged at substantially equal intervals in parallel to one another along the circumference of the sheet. Each group includes diamond-with-bar shaped grooves 110, and each groove 110 is formed by combining the arrowhead shaped groove 60 having the arrow tip directed downwardly and the arrowhead shaped groove 70 having the arrow tip directed upwardly connected back to back to form a diamond shape. A bar shaped groove 80 is diagonally and horizontally added to the diamond. The interval between adjacent grooves 110 in the axial direction is suitably selected. In the diamond-with-bar shaped groove 110, the arrowhead shaped grooves 60 and 70 serve as dynamic pressure generating grooves and the bar shaped groove 80 serves as a lubricant holding groove.

Figure 5A:
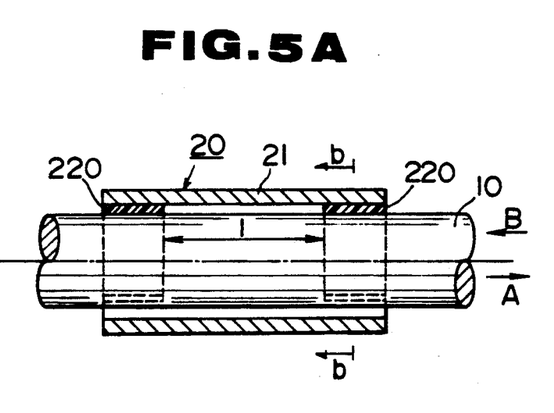
FIGS. 5A and 5B are respectively longitudinal and cross sectional views of a bearing with dynamic pressure grooves of another embodiment of the present invention.
Figure 5B:
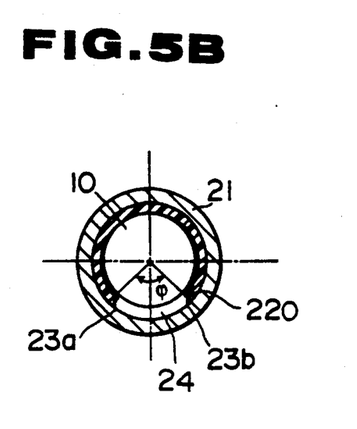

Another embodiment will be described with reference to FIGS. 5A and 5B. As shown in FIGS. 5A and 5B, circumferential opposite edges or ends 23a and 23b of each resin sheet 220 which is bonded to the inner peripheral surface of the outer cylinder 21 are not butted to each other; but, rather, a circumferential gap 24 is formed between the ends 23a and 23b. The gap 24 represented by a center angle $\phi$ along the inner circumference of the outer cylinder 21 is selected to be not larger than 120 degrees.

In this respect, the dynamic pressure generating grooves 60 and 70 are only required to be formed in a range at which the bearing surface substantially receives the load from the shaft body 10. The range is normally determined to be equal to a circumferential angle of 240 degrees or more in the inner peripheral surface of the outer cylinder 21. Accordingly, the center angle $\phi$ between the opposite edges of the sheet 22 is preferably 120 degrees or less. Furthermore, even when the load receiving range of the bearing surface is required to be approximately 360 degrees in the circumferential angle depending on load conditions, it is not required to form the pattern of the dynamic generating grooves 60 and 70 to be continuous at the circumferential opposite edges of the sheet 22.

Other structures and the manufacturing method are the same as those in the first embodiment and, thus, the descriptions thereof are omitted.

In this last described embodiment, when bonding the sheet 22 to the outer cylinder 21, since there is no need to butt the opposite edges of the sheet 22 to each other, the sheet 22 can be formed in the following method.

A large size of resin sheet 22A is formed by using PTFE as a main component mixed with glass fiber as a material for improving the wear-resistant properties. One surface of the sheet 22A is subjected to a dehydrofluorine treatment as a pretreatment for bonding. In this embodiment, a primer which is exclusively used for fluorine resin is used and a normal method is employed. Thereafter, the sheet 22A is put in a rolling machine and the dynamic pressure generating grooves 100 (or 60 and 70) having the pattern, for example, shown in FIG. 1D, are formed in the other surface of the sheet 22A which is not subjected to the dehydrofluorine treatment while the sheet 22A is heated and pressed. As a result, the large size sheet 22A with dynamic pressure generating grooves as shown in FIGS. 6A or 6B is formed.

Following this, a rubber adhesive which is set to have a suitable viscosity by a solvent is coated uniformly on the surface of the large size sheet 22 which has been subjected to the dehydrofluorine treatment. After volatilizing the solvent to cause a half-dried condition, the large size sheet 22 is cut into a plurality of sheets 22 having a desired size.

Figure 6A:
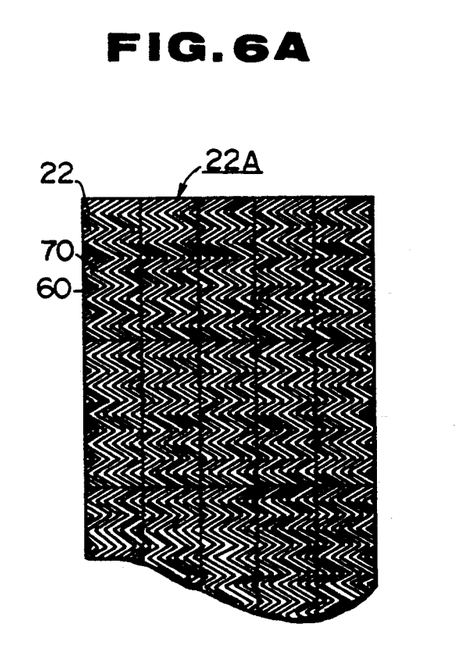
FIGS. 6A and 6B are plan elevational views each showing a large size resin sheet before cutting into a plurality of sheets used in the bearing with dynamic pressure grooves of FIGS. 5A and 5B.
Figure 6B:
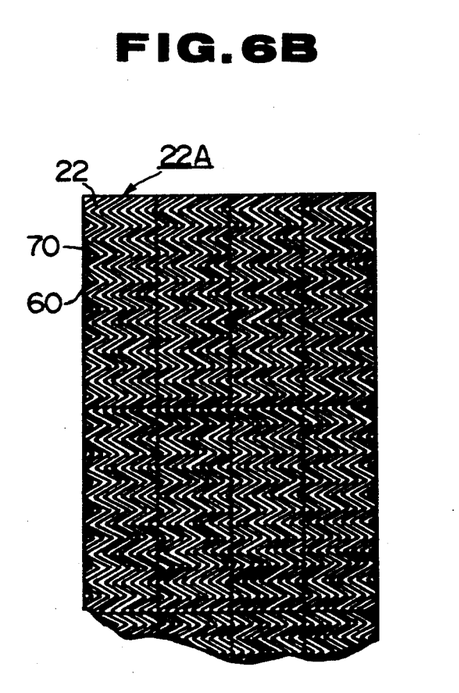

FIG. 6A shows the large size sheet 22 having a pattern of zigzag-shaped grooves 100 (or the combination of the grooves 60 and 70) in which, when the upper and lower edges of each cut-out sheet 22 are butted to each other, patterns of the individual dynamic pressure generating grooves 60 and 70 are made exactly continuous. In contrast, in FIG. 6B, the large size sheet 22A is cut into the plurality of sheets 22 at arbitrary positions so that the dynamic pressure generating grooves 60 and 70 are not continuous at the upper and lower edges of each cut-out sheet 22.

Accordingly, in manufacturing the bearings 20 with dynamic pressure grooves respectively having different widths and inner diameters, by forming the large size sheet 22A having dynamic pressure generating grooves formed by a rolling method and by cutting the large size sheet 22A with different cutting lengths and different cutting widths, a desired unit sheet 22 can be easily cut out. Thus, the efficiency is very satisfactory and the productivity is excellent.

Figure 7:
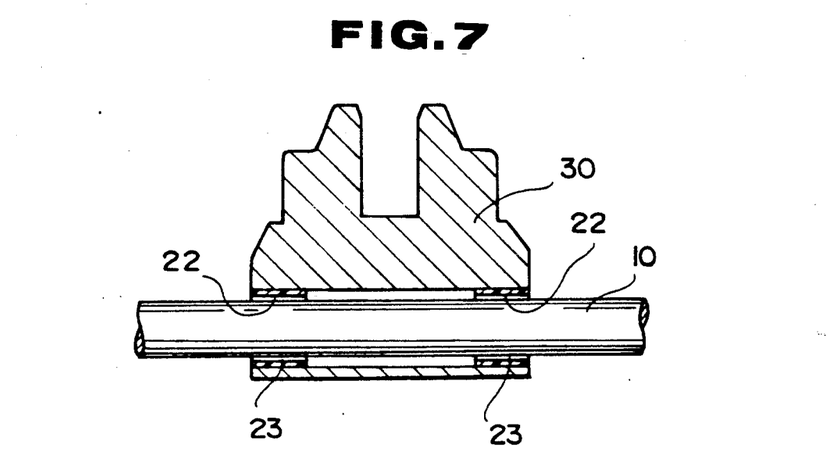
FIG. 7 is a longitudinal sectional view of a bearing with dynamic pressure grooves of still another embodiment of the present invention.

Still another embodiment will be described with reference to FIG. 7. In this embodiment, the sheets 22 having the dynamic pressure generating grooves and made of the resin containing PTFE as a main component mixed with a material for improving the wear-resistant properties is assembled to an inner peripheral surface of an outer cylinder 30 having a non-cylindrical outer surface. The function and effect of this bearing with dynamic pressure generating grooves is not different from that in the other embodiments. In this embodiment, the shape of the outer cylinder is not limited to a cylindrical-shape, but other shapes, such as a square shape or the like, may be used if needed.

In addition, when the pattern of the grooves of the bearing with dynamic pressure grooves shown in FIGS. 5A and 5B is formed as shown in FIGS. 4A and 4B, the bearing with dynamic pressure grooves becomes a rotation type bearing.

As described in the foregoing, in the bearing with dynamic pressure grooves using PTFE, since it is structured in which a sheet made of a resin containing PTFE as a main component is bonded to an inner peripheral surface of an outer cylinder, the dimensional tolerances of the inner diameter of the bearing are of high accuracy and very satisfactory friction properties can be obtained. Furthermore, excellent wear-resistant properties are obtained due to the pumping action of the dynamic pressure generating grooves.

Further, in the bearing with dynamic pressure grooves employing a sheet having a gap in a circumferential direction in the present invention, since the resin sheet having dynamic generating grooves formed in an inner face is bonded to the inner peripheral surface of the outer cylinder with the gap between circumferential opposite ends of the sheet, there is no need to butt the circumferential opposite ends of the sheet to each other at the time of bonding. Accordingly, assembly is easy owing to this structure.

Also, in this bearing with dynamic pressure grooves, since there is no strict requirements for the pattern of the dynamic pressure generating grooves of the sheet or the width of the sheet, the sheet can be obtained by cutting a large size resin sheet having dynamic pressure generating grooves formed by plastic working into a plurality of sheets. In this cutting, a cutting width and a cutting length can changed to obtain a desired single sheet without taking the consistency of the groove pattern into consideration. The sheet can be bonded to the inner surface of the outer cylinder without requiring the circumferential opposite ends of the sheet to be butted to each other. As a result, it is possible to prepare sheets for a plurality of different bearing inner diameters and bearing widths at will. Thus, a dynamic pressure type slide bearing for linear movement which is easily mass-produced and inexpensive can be provided.

In the manufacturing method of the bearing with dynamic pressure generating grooves, since the dynamic pressure generating grooves are formed in one surface of a resin sheet by plastic working, the sheet having a desired groove depth, a desired groove shape, and a desired sheet thickness can be uniformly formed.

Furthermore, in the manufacturing method, since size is corrected by inserting a rod into the inside of the cylindrically formed sheet, the bearing gap can be controlled arbitrarily and performance with a high accuracy can be achieved by suppressing the runout of the shaft and the bearing. Further, in the case in which a plurality of bearing entities are assembled in an axial direction at predetermined intervals to form a unitary bearing assembly, it is easy to achieve the coaxiality of the plurality of bearings. Thus, it is possible to manufacture a bearing having excellent friction properties and wear-resistant properties, and still have excellent dimensional tolerances and high quality.

What is claimed is:

1. A bearing with dynamic pressure grooves, comprising:
    an outer cylinder;
    a sheet made of a thermoplastic resin containing PTFE as a main component and bonded to an inner peripheral surface of said outer cylinder, said thermoplastic resin containing about 50 to about 90 wt. % PTFE, and further containing at least one wear-resistant property improving material selected from the group consisting of graphite, carbon fiber, molybdenumdisulfide, polyimide, polyoxybenzoil, and glass fiber, said sheet having a thickness between about 0.1 and about 2.0 mm; and
    a plurality of grooves for generating a dynamic pressure formed, by plastic work in advance, in an inner surface of said sheet.

2. A bearing with dynamic pressure grooves, comprising:
    an outer cylinder;
    a plurality of sheets made of a thermoplastic resin containing PTFE as a main component and bonded to an inner peripheral surface of said outer cylinder at a predetermined interval in an axial direction, said thermoplastic resin containing about 50 to about 90 wt. % PTFE, and further containing at least one wear-resistant property improving material selected from the group consisting of graphite, carbon fiber, molybdenumdisulfide, polyimide, polyoxybenzoil, and glass fiber, said sheet having a thickness between about 0.1 and about 2.0 mm; and a plurality of grooves for generating a dynamic pressure formed, by plastic work in advance, in an inner surface of said sheet.

* * * * *